US012528095B2

(12) United States Patent
Ramsuer et al.

(10) Patent No.: US 12,528,095 B2
(45) **Date of Patent: *Jan. 20, 2026**

(54) HOSE END SPRAYERS AND METHODS OF MANUFACTURING THE SAME

(71) Applicant: SILGAN DISPENSING SYSTEMS CORPORATION, Richmond, VA (US)

(72) Inventors: Brandon Ramsuer, Henrico, VA (US); Jacob Vanbecelaere, Olathe, KS (US)

(73) Assignee: Silgan Dispensing Systems Corporation, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,427

(22) Filed: Aug. 10, 2023

(65) Prior Publication Data

US 2023/0381798 A1 Nov. 30, 2023

Related U.S. Application Data

(63) Continuation of application No. 17/523,116, filed on Nov. 10, 2021, now Pat. No. 11,759,807.

(51) Int. Cl.
*B05B 7/24* (2006.01)
*B05B 7/04* (2006.01)

(52) U.S. Cl.
CPC .......... *B05B 7/2443* (2013.01); *B05B 7/0408* (2013.01)

(58) Field of Classification Search
CPC ....... B05B 7/2443; B05B 7/0408; B05B 7/12; B05B 1/3026; B05B 12/0026
See application file for complete search history.

(56) References Cited

U.S. PATENT DOCUMENTS 3,437,273 A * 4/1969 Hagfors ................ B29B 7/7438 137/625.41
3,764,074 A * 10/1973 James ..................... E03C 1/046 239/318
3,770,205 A * 11/1973 Proctor ................. B01F 25/316 239/317
RE29,405 E * 9/1977 Gunzel, Jr. ............. B05B 15/20 239/394
4,121,773 A * 10/1978 Headen ................. B05B 7/2445 239/317
4,767,058 A * 8/1988 LaRosa ................. B05B 7/2443 239/309
5,100,059 A * 3/1992 Englhard ............. B05B 7/2448 222/484
6,378,785 B1 * 4/2002 Dodd .................... B05B 7/1209 239/394
10,632,481 B1 * 4/2020 Laible ................. B05B 12/1418
11,759,807 B2 * 9/2023 Ramsuer ............. B05B 12/0026 222/630

(Continued)

FOREIGN PATENT DOCUMENTS

AU 6278598 A * 11/1998

*Primary Examiner* — Bob Zadeh
(74) *Attorney, Agent, or Firm* — Hinckley Allen & Snyder; Stephen Holmes

(57) ABSTRACT

A dispensing system including a hose-end-sprayer having a sprayer body assembled with a selected valve having a lever to selectively operate the hose-end-sprayer and a shipping clip capable of retaining the valve in a closed position during shipping; methods for manufacturing and assembling the same using a single sprayer body with multiple valve configurations.

12 Claims, 10 Drawing Sheets

(56) References Cited

U.S. PATENT DOCUMENTS

| | | | | |
|---|---|---|---|---|
| 2002/0079381 | A1* | 6/2002 | Smith | B05B 7/2443 239/318 |
| 2003/0052193 | A1* | 3/2003 | Shanklin | F16K 5/12 239/375 |
| 2003/0192964 | A1* | 10/2003 | Foster | B05B 7/2443 239/525 |
| 2005/0173567 | A1* | 8/2005 | Shanklin | B05B 7/2443 239/398 |
| 2005/0189436 | A1* | 9/2005 | Shanklin | B05B 7/2443 239/525 |
| 2006/0091237 | A1* | 5/2006 | Dodd | B05B 7/1209 239/315 |
| 2010/0213223 | A1* | 8/2010 | Ballentine | A45F 3/04 222/145.5 |
| 2010/0213280 | A1* | 8/2010 | Laible | B05B 7/1209 239/310 |
| 2015/0250110 | A1* | 9/2015 | Lo | F16L 29/002 239/581.1 |
| 2018/0056310 | A1* | 3/2018 | Dodd | B05B 1/267 |
| 2023/0381798 | A1* | 11/2023 | Ramsuer | B05B 7/12 |

* cited by examiner

HOSE END SPRAYERS AND METHODS OF MANUFACTURING THE SAME

CROSS-REFERENCE TO RELATED APPLICATIONS

This application claims the benefit of U.S. application Ser. No. 17/523,116, entitled "HOSE END SPRAYERS AND METHODS OF MANUFACTURING THE SAME," filed 10 Nov. 2021, and incorporates the same herein by reference in its entirety.

BACKGROUND OF THE INVENTION

Field of the Invention

Embodiments of the invention relate to dispensing sprayers and more particularly to aspiration-type sprayers that dispense a carrier fluid or a carrier fluid with an active agent.

Description of Related Art

Aspiration-type dispensers are readily available and are commonly used to dispense active solutions, such as fertilizers, pesticides, cleaning agents, and other chemicals, with a carrier fluid such as water. Such dispensers are also known as hose-end-sprayers because they are frequently attached to a hose attached to a water supply so that water can act as the carrier fluid passing through the hose-end-sprayer.

For example, U.S. Pat. No. 7,631,819 discloses a sprayer head assembly having a valve moveably positioned between a first "off" position and a second "on" position wherein flow of both a carrier fluid and an active agent are blocked in the "off" position and wherein water—acting as a carrier fluid—passes over a chemical inlet passage in an "on" position, sucking an active agent or chemical into the carrier fluid stream for dispersion from the sprayer head.

In another example, U.S. Pat. No. 7,328,857 discloses a sprayer head assembly having three valve positions: a first "off" position in which carrier fluid (such as water from a hose attached to the sprayer head) and a chemical fluid do not flow through the sprayer; a second position in which the carrier fluid—but not the chemical fluid—is allowed to pass through the sprayer; and a third position in which both the carrier fluid and the chemical fluid pass through the sprayer.

Hose-end-sprayers such as these are common and can be used with many different products. They are found on store shelves and are shipped as e-commerce products. One of the issues facing many such sprayers delivered in e-commerce streams is leakage. To avoid leakage, the dispenser may be shipped separate from a container of liquid such that the user must attach the dispenser to a container of concentrated chemical after receiving an e-commerce package, increasing the risk of exposure to the concentrated chemical for the user.

While various types of hose-end-sprayers and dispensers are available, improved versions suited more for e-commerce shipping streams, or sprayers having fewer parts or cheaper assembly requirements are desired.

BRIEF SUMMARY OF THE INVENTION

According to certain embodiments of the invention, a dispensing system comprises a hose-end-sprayer attached to a container, the container holding a quantity of fluid to be dispensed. The hose-end-sprayer may be attached to a hose or other carrier fluid source to provide water or other carrier fluid to the hose-end-sprayer.

In various embodiments of the invention, a hose-end-sprayer includes a sprayer body and one or more valves configured to attach to the sprayer body. In this way, multiple sprayer configurations may be created using a standard sprayer body, eliminating the need to produce custom sprayer bodies for different hose-end-sprayer configurations and reducing manufacturing costs.

In some embodiments of the invention, a shipping clip is also provided. The shipping clip may attach to the sprayer body and an associated valve such that the shipping clip retains the valve in an "off" position such that fluid is prevented from escaping or leaking from a dispensing system and hose-end-sprayer during non-use or during shipping. According to various embodiments, a shipping clip may include a body flange capable of snapping or otherwise temporarily attaching to the sprayer body. A shipping clip may also include a valve flange extending off a body of the shipping clip and configured to seat in a valve orifice or hole. In other embodiments, the shipping clip may include an orifice or hole for accepting a flange extending off a valve. A shipping clip may be seated on the sprayer body and engaged with the valve to prevent rotation or movement of the valve during shipping or storage.

In some embodiments of the invention, a valve may be configured to provide two positions: a first "off" position in which fluid does not pass through the valve and an "on" position in which a carrier fluid passes through the valve, picking up a chemical or other fluid through a suction or venturi effect as with known systems. In other embodiments, a valve may be configured to provide three positions: a first "off" position in which fluid does not pass through the valve, a second "carrier fluid position" in which only carrier fluid is allowed to pass through the valve, and a third "on" position in which the carrier fluid mixes with a chemical or other fluid stored in a container attached to the hose-end-sprayer and is expelled from the dispensing system. Other valve configurations may also be used with embodiments of the invention.

Valves used with various embodiments of the invention may include a valve orifice or opening in a front surface or edge thereof which is configured to mate with or accept a valve flange of a shipping clip. In other embodiments, the valve may include a flange that mates with or fits into a flange opening in a shipping clip. Positioning or engagement of a shipping clip with a valve prevents rotation of the valve without additional forces being applied. This serves to hold the valve in a closed or "off" position during shipping or when the dispensing system is not in use.

A valve according to embodiments of the invention also includes a lever guide. In some embodiments of the invention, a lever guide is configured as a channel or opening in a wall of the valve. The lever guide is configured or shaped to accept and mate with a lever flange extending off a lever used to rotate the valve. During assembly of a hose-end-sprayer, a lever may be held in position relative to the sprayer body, extending through a lever opening therein, as a valve is assembled into the sprayer body. As the valve is inserted into the sprayer body, the lever flange engages or slides into the lever guide on the valve. A retention feature, such as a snap bead, hook, clip, or other feature may be engaged when the valve is fully inserted such that the lever is fixably attached to the valve. Movement of the lever thereby moves the valve, allowing a user to move or transition the valve between the various valve positions.

According to various embodiments of the invention, a hose-end-sprayer having a customized valve is manufactured by molding a universal sprayer body, molding one or more valves configured to fit with the sprayer body, molding and providing a lever, and providing other parts generally associated with hose-end-sprayers and assembling the parts to form a completed hose-end-sprayer. In some embodiments, a shipping clip is molded and assembled to the sprayer body and valve.

BRIEF DESCRIPTION OF THE SEVERAL VIEWS OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
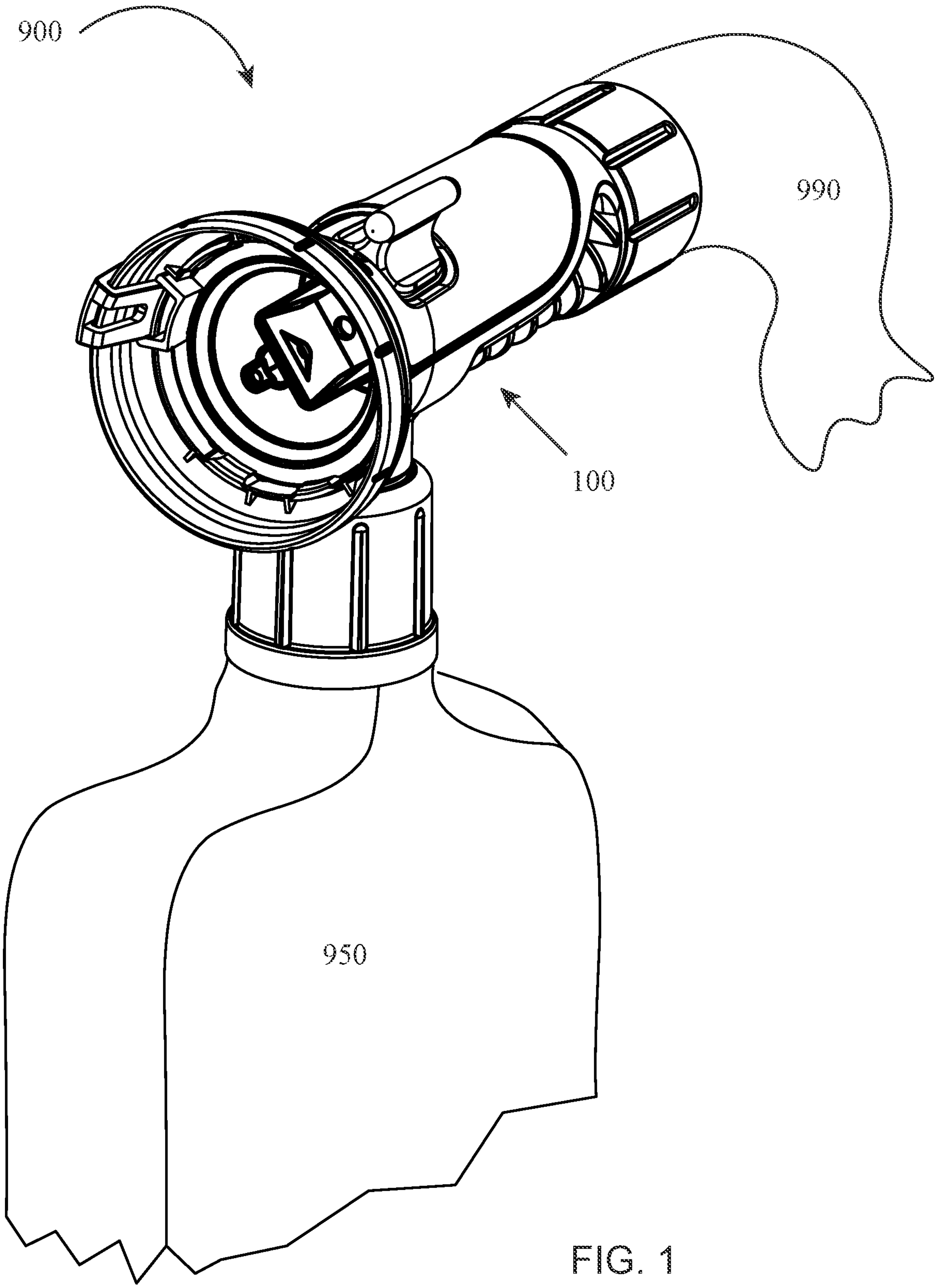
FIG. 1 illustrates a dispensing system according to particular embodiments of the invention.

According to embodiments of the invention, a dispensing system 900 may include a hose-end-sprayer 100 attached to a container 950 as illustrated in FIG. 1. A carrier fluid source 990, such as a hose, may be attached to the hose-end-sprayer 100 as a part of the dispensing system 900.

According to various embodiments of the invention, a container 950 may hold a chemical composition or other fluid. For example, a container 950 may hold or store a pesticide formulation, a fertilizer formulation, a cleaning formulation, or other liquid formulation which a user desires to disperse utilizing a dispensing system 900 according to embodiments of the invention.

Figure 2:
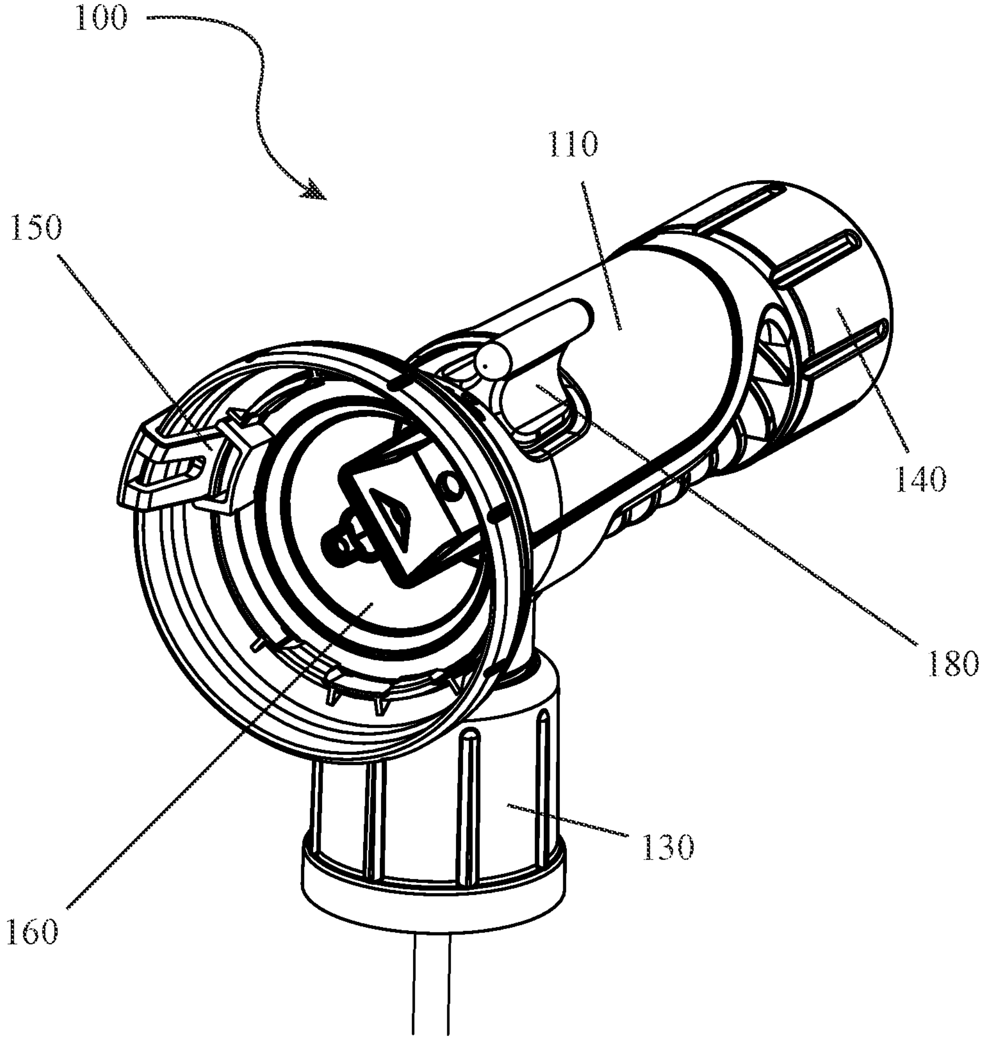
FIG. 2 illustrates a hose-end-sprayer according to various embodiments of the invention.

A hose-end-sprayer 100 according to various embodiments of the invention is illustrated in FIG. 2. The hose-end-sprayer 100 includes a sprayer body 110 having a valve 160 inserted and seated therein. A container nut 130 is attached to a container connection opening 113 of the sprayer body 110 and a hose nut 140 is attached to a hose connection opening 114 of the sprayer body 110. A lever 180 is connected to the valve 160 through a lever opening 118 in the sprayer body 110. Movement of the lever 180 moves or rotates the valve 160 within the sprayer body 110. However, as illustrated in FIG. 1, a shipping clip 150 may be attached to the sprayer body 110 or to the sprayer body 110 and the valve 160 to resist or prevent movement or rotation of the valve 160 relative to the sprayer body 110.

Figure 3:
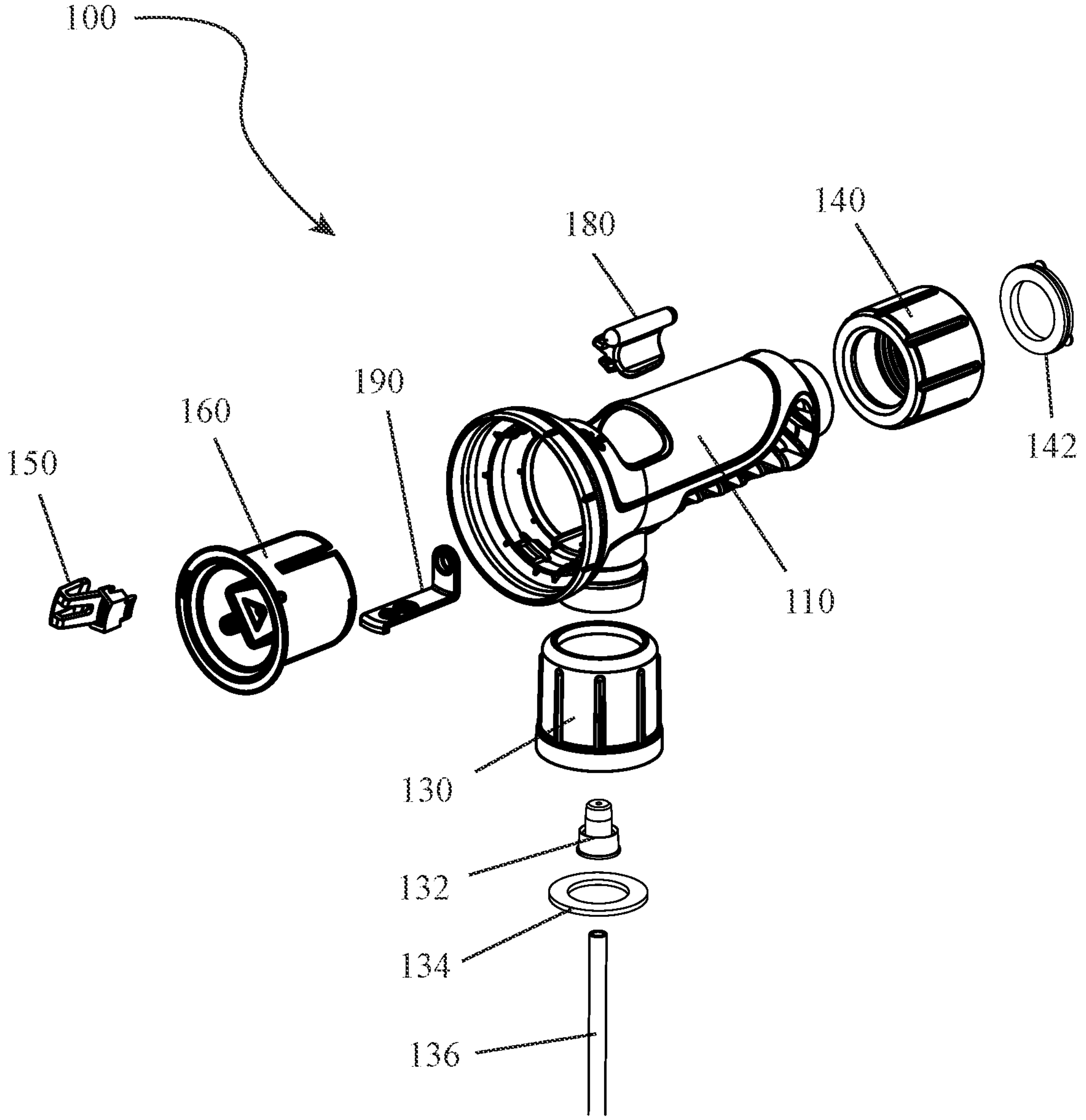
FIG. 3 illustrates a blown-apart assembly drawing of the hose-end-sprayer illustrated in FIG. 2.

A blown-apart assembly view of the hose-end-sprayer 100 illustrated in FIG. 2 is illustrated in FIG. 3. As shown, a hose-end-sprayer 100 may include a sprayer body 110. A container nut 130, along with a retainer 132, container gasket 134, and dip tube 136, may be assembled to a container connection opening 113 of the sprayer body 110. The retainer 132 may be snap fit to the sprayer body 110 at one end and connected to the dip tube 136 at the other end when assembled. The container gasket 134 may sit in an interior of the container nut 130 and provide a sealing surface to which a container 900 or bottle may rest when the hose-end-sprayer 100 is attached to a container 900. Conventional features may be used to retain the container gasket 134 in the container nut 130. While the illustrated container connection system includes a container nut 130, a retainer 132, a dip tube 136 and a container gasket 134, components thereof may be eliminated or additional components and features may be added as required.

A hose nut 140 and a hose gasket 142 may be assembled to a hose connection opening 114 of the sprayer body 110. The hose gasket 142 may sit in an interior of the hose nut 140 and provide a sealing surface to which a carrier fluid source 990, such as a hose, may seat when attached to the hose nut 140. Conventional features may be used to retain the hose gasket 142 within an interior of the hose nut 140. While the illustrated hose connection system includes a hose nut 140 and gasket 142, other components may be added—such as an anti-siphon device 144—or removed from the system.

A seal pad 190 may be inserted into the sprayer body 110 and seated to provide a sealing surface and openings between the valve 160 and the sprayer body 110.

A hose-end-sprayer 100 also includes a valve 160. The valve 160 may be assembled into the dispensing opening 199 and seated or secured within an interior of the sprayer body 110. The valve 160 may be assembled in such a manner that it may rotate about an axis within the sprayer body 110. When assembled, the valve 160 may engage the lever 180 which is held in the lever opening 118 as the valve 160 is assembled to the sprayer body 110. The lever 180 may snap into the valve 160, helping to retain the valve 160 within the interior of the sprayer body 110 and providing a lever 180 to rotate the valve 160 about its central axis within the sprayer body 110. As the valve 160 rotates, the seal pad 190 remains fixed within the sprayer body 110 interior.

A shipping clip 150 may be attached to the sprayer body 110 or to the sprayer body 110 and the valve 160 to help retain the valve 160 in a given "on" or "off" position as desired. For example, the shipping clip 150 may be assembled or attached to the sprayer body 110 and valve 160 when the valve 160 is in an "off" position to help maintain the "off" position during shipping of the hose-end-sprayer 100 or a dispensing system 900 utilizing a hose-end-sprayer 100 according to embodiments of the invention.

Figure 4:
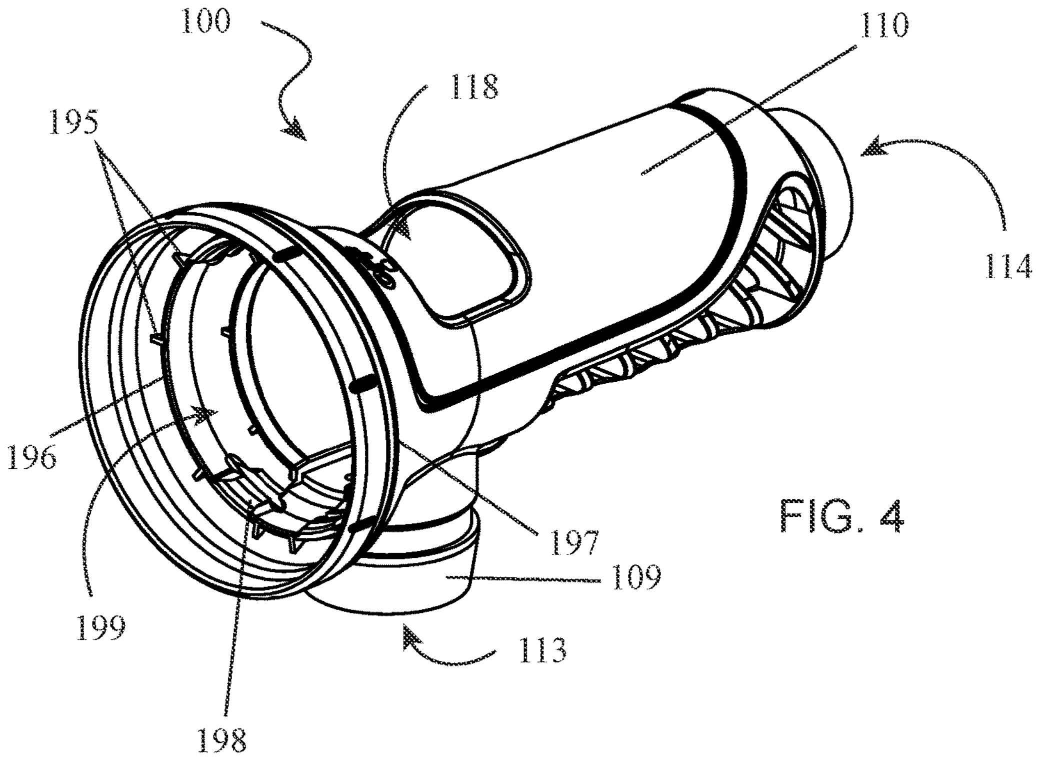
FIG. 4 illustrates a sprayer body of a hose-end-sprayer according to various embodiments of the invention.
Figure 5:
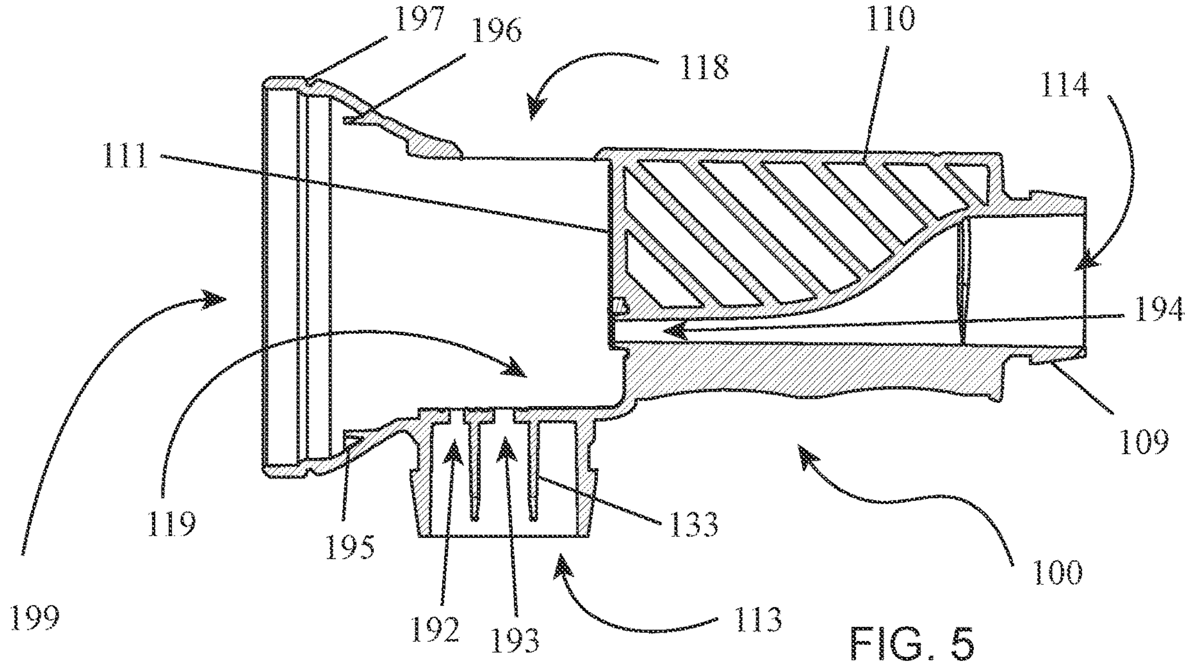
FIG. 5 illustrates a cross-sectional view of the sprayer body illustrated in FIG. 4.

A sprayer body 110 according to various embodiments of the invention is illustrated in FIG. 4 and a cross-sectional view of the same sprayer body 110 is illustrated in FIG. 5. According to certain embodiments of the invention, a sprayer body 110 may include numerous openings. For example, the sprayer body 100 may include a hose connection opening 114, a container connection opening 113, a lever opening 118, and a dispensing opening 199. Other openings in portions of the sprayer body 100 may also exist to allow flow of a carrier fluid or product fluids through the sprayer body 110 and into various components assembled with the sprayer body 100.

As illustrated in FIG. 5, the end of the sprayer body 110 adjacent the dispensing opening 199 includes an interior space defined by a generally cylindrical shape and a rear wall 111 in the dispensing opening 199. A carrier fluid opening 194 is formed in the rear wall 111 and a carrier fluid flow path through which a carrier fluid may pass through the sprayer body 110 extends from the hose connection opening 114 to the carrier fluid opening 194. A product fluid opening 193 is located in a portion of an interior wall of the sprayer body 110 as illustrated. The product fluid opening 193 is surrounded by a retainer connection 133 extending downwardly from an inner portion of the sprayer body 110 towards the container connection opening 113. A vent opening 192 in the sprayer body 110 wall between an interior of the sprayer body 110 and the container connection opening 113 is located outside the circumference of the retainer connection 133. The vent opening 192 is generally positioned in the sprayer body 110 to allow atmospheric air to pass through the vent opening 192 into a container 950.

An interior portion of the dispensing opening 199 may also include a seal pad seat 119 into which a seal pad 190 may be fitted and retained.

According to various embodiments of the invention, a shipping clip 150 may be assembled on or attached to the sprayer body 110 as illustrated in FIG. 1. Such shipping clips 150 may be retained on the sprayer body 110 using any one of, or multiple, features in the sprayer body 110 or the sprayer body 110 and the valve 160. For instance, as illustrated in FIGS. 4 and 5, a sprayer body 110 may include one or more recesses 197 about an exterior surface of the sprayer body 110 adjacent the dispensing opening 199. The one or more recesses 197 may be configured to accept a flange, rib, or other projection extending from a shipping clip 150. The interaction of a recess 197 with such shipping clip 150 features may help retain the shipping clip 150 on the sprayer body 110. In other embodiments, a shipping clip 150 may include a recess and a bead, flange, or ridge on the exterior surface of the sprayer body 110 may interact with the recess to help hold the shipping clip 150 in place when assembled on the sprayer body 110.

A clip rail 196, also illustrated in FIGS. 4 and 5, may also assist in supporting a shipping clip 150. For example, a shipping clip 150 may include a rail seat 156 configured to straddle the clip rail 196 and to support the shipping clip 150 in its position on the sprayer body 110. In other embodiments, the combination of the clip rail 196 and the rail seat 156 helps position the shipping clip 150 in a position desired to help prevent the rotation of a valve 160.

A sprayer body 110 may also include one or more clip stops 195 configured to retain a shipping clip 150 between two clip stops 195. In various embodiments of the invention, a clip stop 195 may prevent movement of the shipping clip 150 when a force is applied to the valve 160 such that the valve 160 will not move without the exertion of a given force; when such force is met, the shipping clip 150 will pop-off or be disengaged from the valve 160 by interaction with the clip stop 195. FIG. 2 illustrates a shipping clip 150 seated between the two clip stops 195 identified in FIG. 4. The positioning of the shipping clip 150 between the two clip stops 195 helps to prevent movement of the shipping clip 150.

A sprayer body 110 may also include one or more valve detents 198. As illustrated in FIG. 4, a valve detent 198 may be formed on a surface of a clip rail 196. The one or more valve detents 198 may retain a valve 160 in the sprayer body 110 once assembled therein. For example, a valve 160 may be pushed into the opening of the sprayer body 110 such that the valve body 163 passes the valve detents 198 and the valve flange 165 snaps over the valve detents 198 and is then held within the sprayer body 110 by the valve detents 198. In some embodiments of the invention, the valve detents 198 may be sloped to allow a valve flange 165 of a valve 160 deform and pass over a valve detent 198 and then be retained by a back or rear surface of the valve detent 198 once assembled.

Snap beads or other connection features may circumscribe or be located on an exterior surface of the sprayer body 110 adjacent the container connection opening 113 and the hose connection opening 114. As illustrated in FIGS. 4 and 5, the sprayer body 110 may include ramps 109 adjacent the container connection opening 113 and the hose connection opening 114 such that the container nut 130 and hose nut 140 may be pushed over the ramps 109 and snap-fit onto the sprayer body 110 in such a manner that the container nut 130 and hose nut 140 are then retained on the sprayer body 110. While ramps 109 are illustrated, other connection or retention features as known in the art may be used with various embodiments of the invention to retain the container nut 130 and hose nut 140 on the sprayer body 110.

Figure 6:
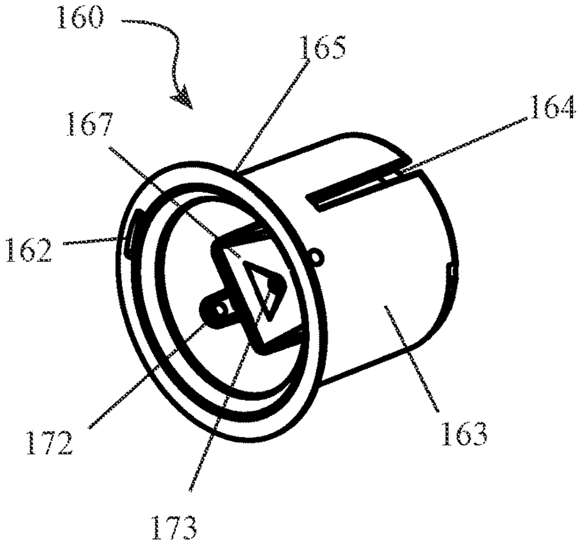
FIG. 6 illustrates a perspective view of a valve according to various embodiments of the invention.
Figure 7:
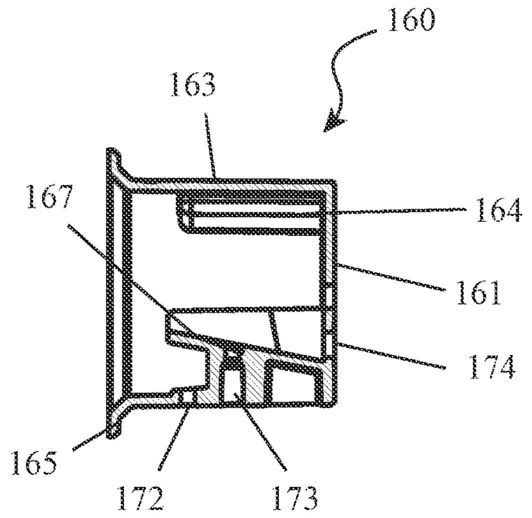
FIG. 7 illustrates a cross-sectional view of the valve illustrated in FIG. 6.

A valve 160 according to certain embodiments of the invention is illustrated in FIGS. 6 and 7. A valve 160 may include a generally cylindrical shape having a generally cylindrical valve body 163 and a rear wall 161. An interior space is defined within the valve body 163 and the rear wall 161. A valve flange 165 circumscribes an opening in the valve 160 opposite the rear wall 161. Portions of the valve flange 165 extend away from the valve body 163 and may be configured to engage with a portion of a sprayer body 110 to retain the valve 160 within the sprayer body 110. One or more shipping clip orifices 162 or openings may exist in the valve 160 such as in the valve flange 165 illustrated in FIG. 6. A lever guide 164 may also be present in the valve body 160 as illustrated.

According to embodiments of the invention, a valve 160 may include openings through which gas, fluid, or product may flow. As illustrated in FIGS. 6 and 7, a valve 160 may include a valve vent opening 172, a valve product fluid opening 173, and a valve carrier fluid opening 174. When a valve 160 is in an "on" state or state allowing fluid to pass through the hose-end-sprayer 100, the valve vent opening 172 may be aligned with the vent opening 192 in the sprayer body 110, and the valve product fluid opening 173 and valve carrier fluid opening 174 may be aligned with the product fluid opening 193 and carrier fluid opening 194 of the sprayer body 110, respectively. In some embodiments of the invention, a seal pad 190 may be seated between the valve 160 and the sprayer body 110 such that when the openings in the valve 160 align with the openings in the sprayer body 110 in the "on" state, openings in the seal pad 190 are also aligned and are positioned between the openings in the valve 160 and the sprayer body 110.

Figure 13:
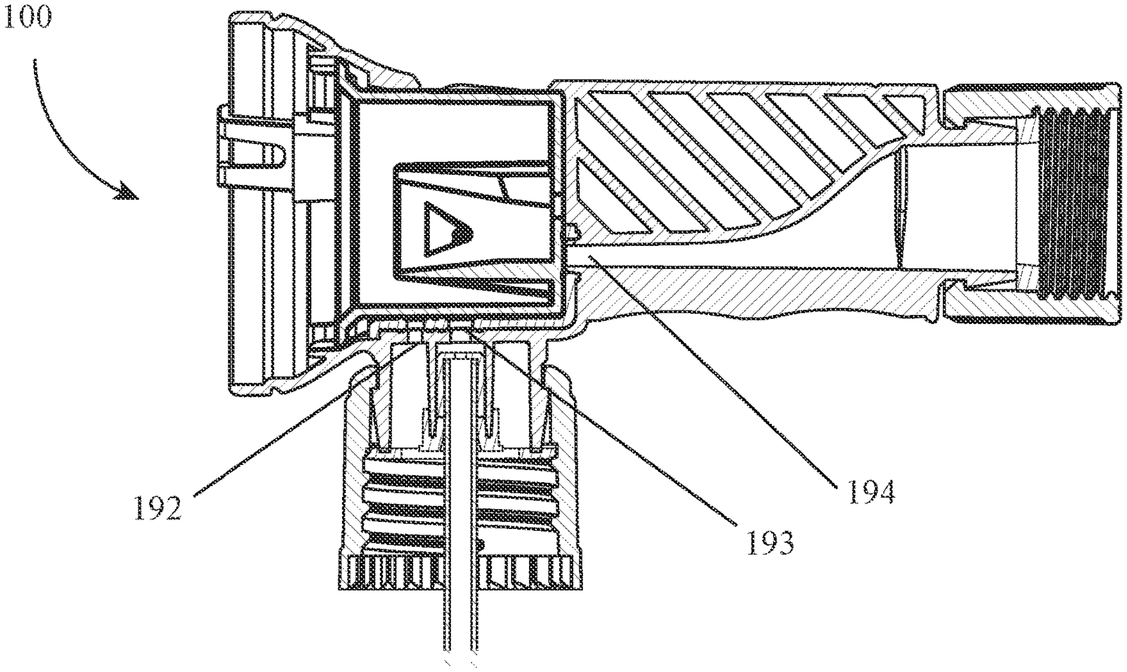
FIG. 13 illustrates a cross-sectional view of a hose-end-sprayer in a first “off” position according to various embodiments of the invention.

The valve 160 of a hose-end sprayer 100 illustrated in FIGS. 6 and 7 may be rotated relative to its sprayer body 110 between a first "off" position and a second "on" position. When assembled as part of a hose-end-sprayer 100, a lever 180 is connected to the valve 160. In some embodiments, a lever flange 182 of a lever 180 fits into the lever guide 164 of the valve 160 such that movement of the lever 180 may control the positioning of the valve 160 relative to the sprayer body 110. Movement of the valve 160 into the first "off" position cause the valve 160 openings—valve vent opening 172, valve product fluid opening 173, and valve carrier fluid opening 174—to seal against a seal pad 190 as illustrated in FIG. 13. In such configuration, product and carrier fluid cannot flow through the hose-end-sprayer 100. Movement of the valve 160 to the second "on" position rotates the valve 160 to a position where the valve 160 openings are aligned with the corresponding openings of the sprayer body 110 and seal pad 190. In this manner, carrier fluid may pass through the hose-end-sprayer 100 and out the valve carrier fluid opening 174 where the fluid impacts a valve fluid ramp 167. The valve fluid ramp 167 may include an air gap associated with the valve product fluid opening 173. Passage of a carrier fluid over the air gap in the valve fluid ramp 167 pulls product from a container attached to the hose-end-sprayer 100 through the valve product fluid opening 173 and into the air gap where it mixes with the carrier fluid and is expelled from the hose-end-sprayer 100.

Figure 8:
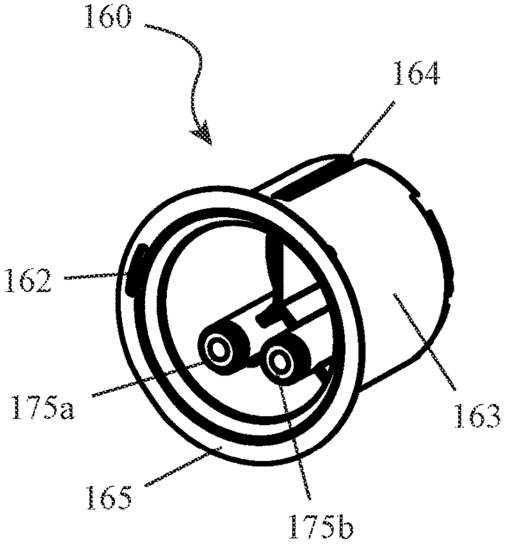
FIG. 8 illustrates a perspective view of a valve according to various embodiments of the invention.
Figure 9:
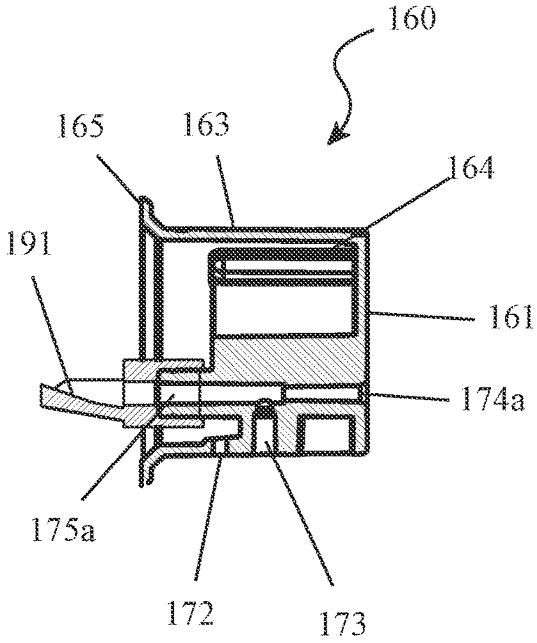
FIG. 9 illustrates a cross-sectional view of the valve illustrated in FIG. 8.

A valve 160 according to other embodiments of the invention is illustrated in FIGS. 8 and 9. As with the valve 160 illustrated in FIGS. 6 and 7, the valve 160 illustrated in FIGS. 8 and 9 includes a generally cylindrical valve body 163, a rear wall 161, a lever guide 164 and a valve flange 165 generally circumscribing the valve 160 opposite the rear wall 161 as illustrated. The valve 160 also includes a valve vent opening 172 and a valve product fluid opening 173. The valve 160 also includes two valve carrier fluid opening 174—a first valve carrier fluid opening **174*a* and a second valve carrier fluid opening 174*b*. The first valve carrier fluid opening 174*a* is associated with a first valve carrier fluid discharge port 175*a* and the second valve carrier fluid opening 174*b* is associated with a second valve carrier fluid discharge port 175*b*. A dispersion device 191 may be connected to the first valve carrier fluid discharge port 175*a* as illustrated in FIG. 9**.

When assembled to a sprayer body 110 according to various embodiments of the invention, a valve 160 such as that illustrated in FIGS. 8 and 9 has three positions: a first "off" position in which fluid is prevented from flowing through a hose-end-sprayer 100 utilizing the valve 160; a second "on" position in which a carrier fluid mixes with a product fluid and is expelled from the hose-end-sprayer 100; and a third "carrier fluid" position in which only carrier fluid is dispersed from the hose-end-sprayer 100. In the first "off" position, the valve 160 openings are not in communication with any openings in the sprayer body 110. In the second "on" position, the first valve carrier fluid opening **174*a* is in communication with the carrier fluid opening 194 of the sprayer body 110 and the valve product fluid opening 173 is in communication with the sprayer body 110 product fluid opening 193. In the third "carrier fluid" position, the second valve carrier fluid opening 174*b* is in communication with the carrier fluid opening 194 of the sprayer body 110 but the valve product fluid opening 173 is not in communication with the product fluid opening 193 of the sprayer body 110, preventing product from flowing through the hose-end-sprayer 100. However, carrier fluid may flow through the hose-end-sprayer 100** in the "carrier fluid" position, allowing a user to dispense water or other carrier fluid without product.

Figure 10:
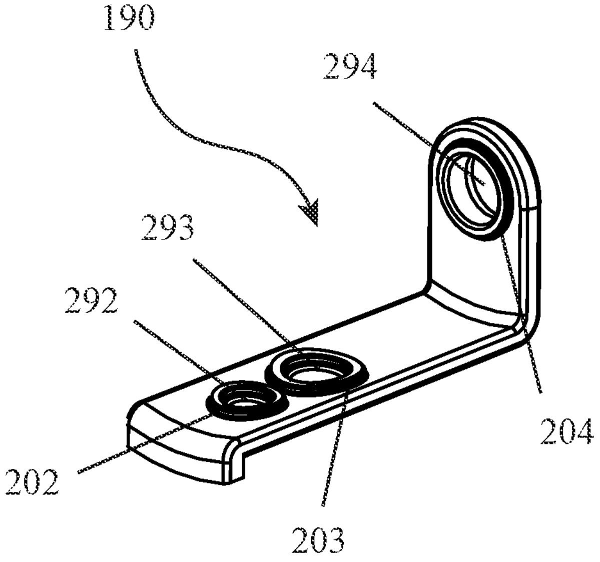
FIG. 10 illustrates an enlarged view of a seal pad according to various embodiments of the invention.

A seal pad 190 according to various embodiments of the invention is illustrated in FIG. 10. A seal pad 190 may include one or more openings through which fluids or gases may flow. For example, the seal pad 190 illustrated in FIG. 10 includes a seal pad vent opening 292, a seal pad product fluid opening 293, and a seal pad carrier fluid opening 294. According to various embodiments of the invention, each seal pad opening may include a seal ring encircling or positioned about the seal pad opening as illustrated in FIG. 10. For example, a vent seal 202 is positioned about the seal pad vent seal opening 292; a product fluid seal 203 is positioned about the seal pad product fluid opening 293; and a carrier fluid seal 204 is positioned about the seal pad carrier fluid opening 294. The seals 202, 203, and 204 may be on both sides of the seal pad 190 or just one side. The seal pads 202, 203, and 204 may seal against a valve 160, a sprayer body 110, or both a valve 160 and a sprayer body 110 to prevent leakage of product when a hose-end-sprayer 100 is in operation in the "on" or "carrier fluid" positions or when in the "off" position.

A seal pad 190 may be assembled to an interior of a sprayer body 110 as illustrated in various embodiments of the invention. The seal pad 190, the sprayer body 110, or both the seal pad 190 and the sprayer body 110 may include features configured to retain the seal pad 190 in the sprayer body 110 during and after assembly.

Figure 11:
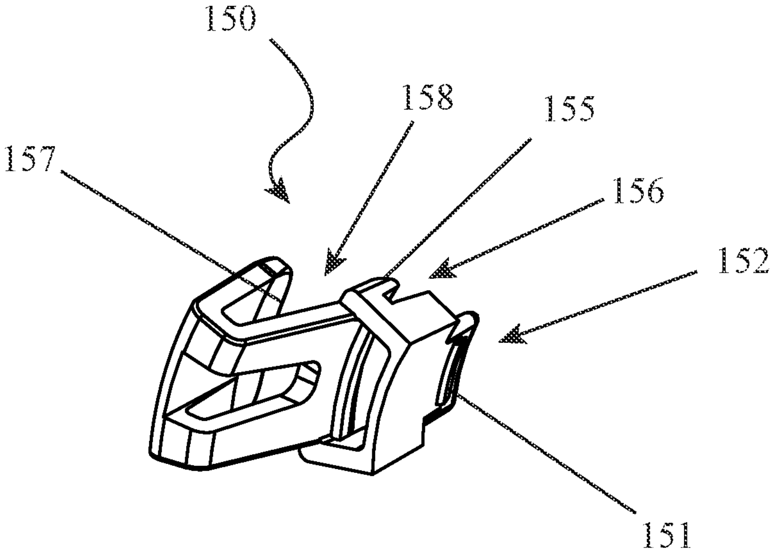
FIG. 11 illustrates an enlarged view of a shipping clip according to various embodiments of the invention.

A shipping clip 150 according to various embodiments of the invention is illustrated in FIG. 11. A shipping clip 150 may include a sprayer body saddle 158 which may fit or mate with the edge of—or an outer rim of—a sprayer body 110 opening. One or more recess flanges 157 positioned on an interior of the sprayer body saddle 158 may fit into or engage one or more recesses 197 on an exterior of a sprayer body 110 to help retain the shipping clip 150 on the sprayer body 110 during shipping or non-use.

When positioned on a sprayer body 110 with the sprayer body saddle 158 over an outer rim of the sprayer body 110, a clip rail saddle 156 may sit over or straddle a clip rail 196 of a sprayer body 110. The positioning of the clip rail saddle 156 on the clip rail 196 may also help to position the shipping clip 150 on the sprayer body 110. As illustrated, the clip rail saddle 156 may include a clip rail saddle extension 155. The clip rail saddle extension 155 may have a width that allows it to fit between two clip stops 195 on the sprayer body 110. Interaction of the clip rail saddle extension 155 with one or more of the clip stops 195 may prevent movement of a valve 160 to which the shipping clip 150 is attached.

A shipping clip 150 may also include one or more valve extensions 152 configured to seat in a shipping clip orifice 162. As shown, a valve extension 152 may extend off of the shipping clip 150 such that it creates a projection that may be inserted into a shipping clip orifice 162 of a valve 160 in order to help retain the shipping clip 150 attachment to the valve 160 and the sprayer body 110. One or more shipping clip valve projections 151 may project off of the valve extension 152 and may be configured to snap into a valve 160 or help retain a shipping clip 150 on a valve 160. A shipping clip valve projection 151 may be on a front side or a rear side of the valve extension 152, or both.

When assembled as part of a hose-end-sprayer 100 according to embodiments of the invention, a shipping clip 150 is positioned such that the sprayer body saddle 158 sits on an exterior rim of the sprayer body 110 with a recess flange 157 positioned in a recess 197 on the exterior of the sprayer body 110, the clip rail saddle 156 sits on a clip rail 196 of the sprayer body 110, a clip rail saddle extension 155 sits adjacent to a clip stop 195, or between two clip stops 195, and the valve extension 152 seats in a shipping clip orifice 162 of the valve 160. A shipping clip 150 positioned in this manner may prevent movement or rotation of the valve 160 within the sprayer body 110. The features of the shipping clip 150 that retain the shipping clip 150 on the sprayer body 110 may be designed such that they will release upon the application of a certain force applied to the valve 160—for instance by applying a force to the lever 180-0 or by a user pulling on the shipping clip 150 with a desired force.

While various embodiments of the invention are described with respect to a shipping clip 150 having a recess flange 157 and shipping clip valve projections 151, it is understood that the shipping clip 150 could instead have or support the recesses and the sprayer body 110 and valve 160—or both—could have projections to fit into shipping clip 150 recesses to accomplish the same goals of retaining a shipping clip 150 on the hose-end-sprayer 100 during shipping and non-use.

Figure 12:
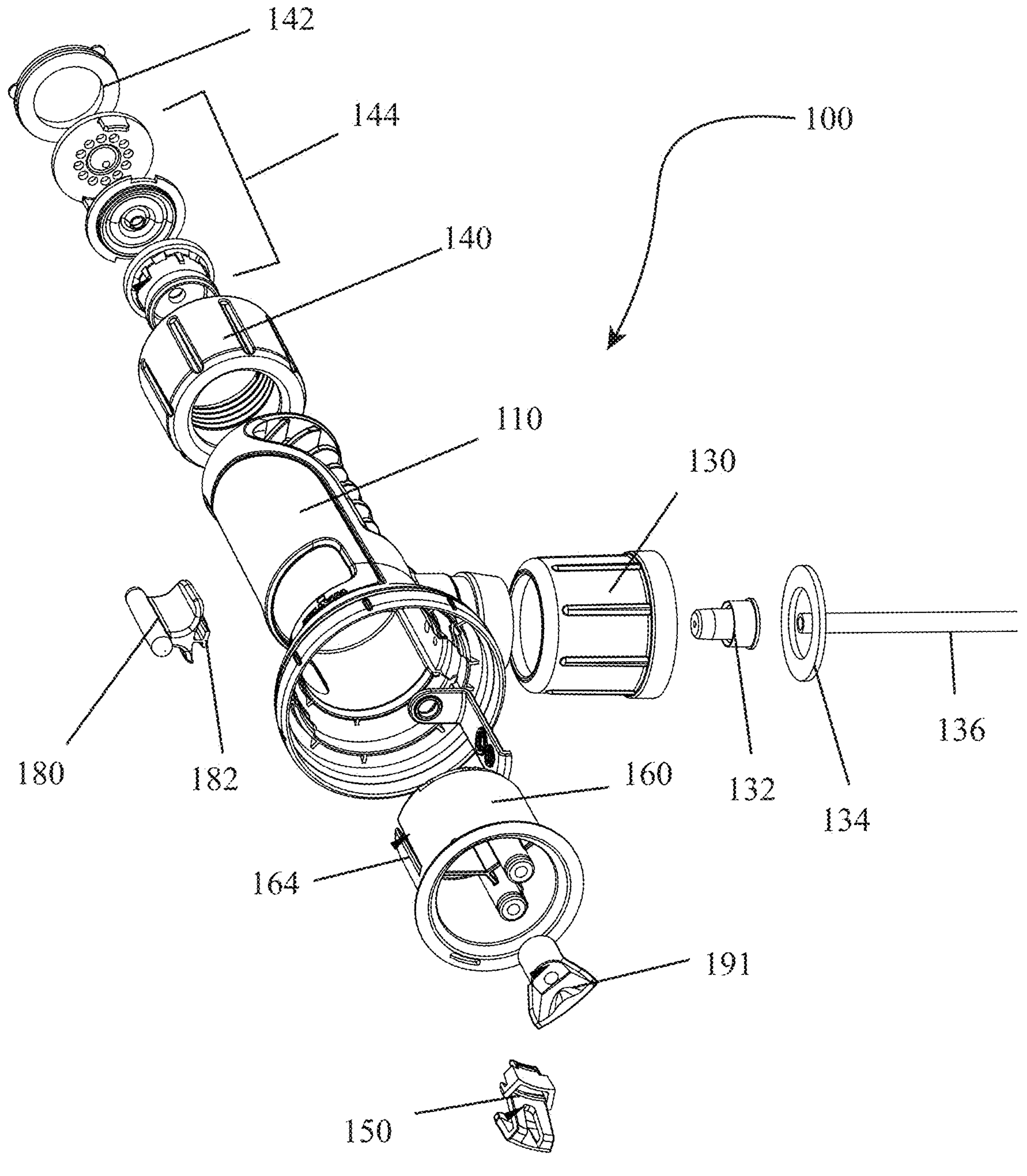
FIG. 12 illustrates a blown apart assembly drawing of a hose-end-sprayer according to various embodiments of the invention.

FIG. 12 illustrates a blown-apart assembly drawing of a hose-end-sprayer 100 according to various embodiments of the invention. The hose-end-sprayer 100 illustrated in FIG. 12 includes the valve 160 illustrated in FIGS. 8 and 9 having three positions and a dispersion device 191 which is assembled to the first valve carrier fluid discharge port in the final assembly. In addition, the hose-end-sprayer 100 illustrated in FIG. 12 includes an anti-siphon component 144 which is made up of various components that prevent backflow or siphoning of carrier fluid tainted with product back through the hose-end-sprayer 100 and into a carrier fluid source attached to the hose-end-sprayer 100. Anti-siphon or backflow prevention devices are well known and any such device can be used with various embodiments of the present invention. Other components of the hose-end-sprayer 100 illustrated in FIG. 12 are similar to, or the same as, those described with respect to FIG. 3.

Figure 14:
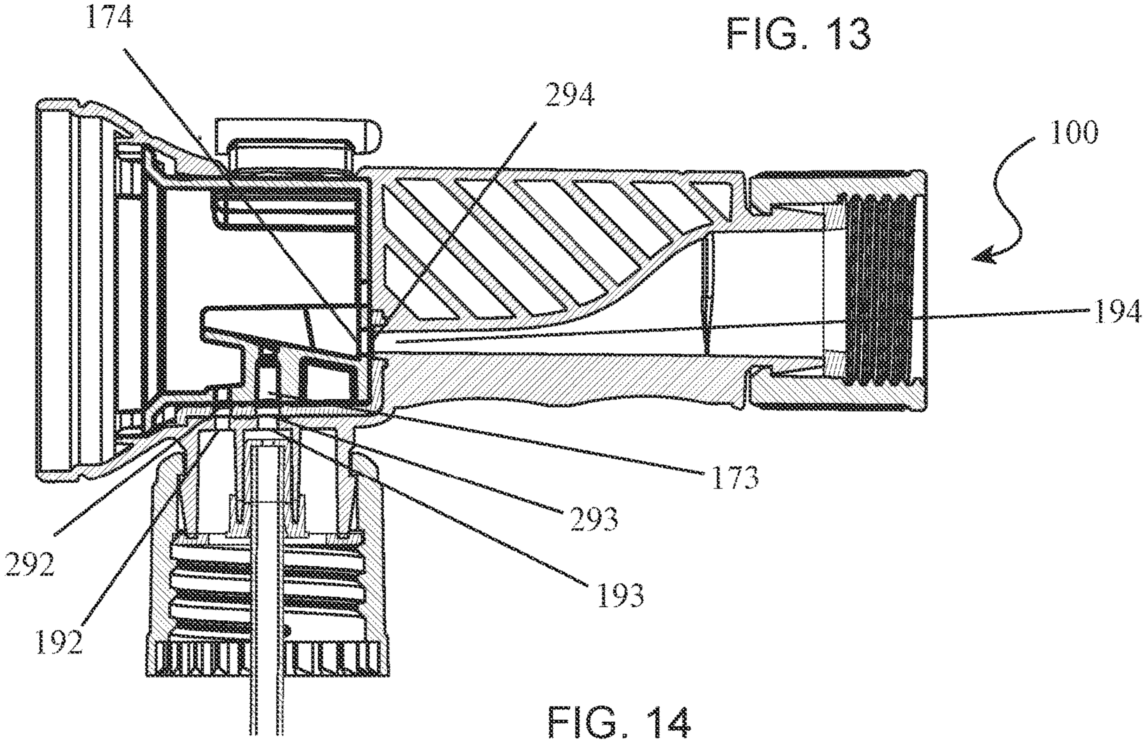
FIG. 14 illustrates a cross-sectional view of the hose-end-sprayer of FIG. 13 in a second “on” position according to various embodiments of the invention.

Cross-sectional views of a hose-end-sprayer 100 according to various embodiments of the invention are illustrated in FIGS. 13 and 14. FIG. 13 illustrates a cross-sectional view of a hose-end-sprayer 100 in a first “off” position in which the carrier fluid opening 194, the product fluid opening 193, and the vent opening 192 are all closed by valve 160. In addition, movement of valve 160 is being prevented or retarded by the presence of shipping clip 150.

FIG. 14 illustrates the same hose-end-sprayer 100 with the shipping clip 150 removed, the valve 160 rotated into a second “on” position, and various openings in communication with each other. For instance, carrier fluid opening 194 is in communication with the seal pad carrier fluid opening 294 and valve carrier fluid opening 174, product fluid opening 193 is in communication with the seal pad product fluid opening 293 and valve product fluid opening 173, and vent opening 192 is in communication with seal pad vent opening 292 and valve vent opening 172. In operation in the “on” position, carrier fluid flows through the hose-end-sprayer 100, through the carrier fluid openings where it strikes the valve fluid ramp 167 and is combined with product flowing through the product openings before being dispersed from the hose-end-sprayer 100.

As illustrated in FIGS. 13 and 14, a retainer 132 may be seated in a retainer connection 133 of the sprayer body 110. A retainer 132 may be snap fit, screwed on, welded, or otherwise attached to the sprayer body 110 at the retainer connection 133. A dip tube 136 may be seated in the retainer 132 such as by friction fit or other retention configuration. The dip tube 136 may transport product fluid from inside a container into a space formed between the retainer 132 and the sprayer body 110 such that it is fed through the product opening 193 when the hose-end-sprayer 100 is dispensing a product.

Figure 15:
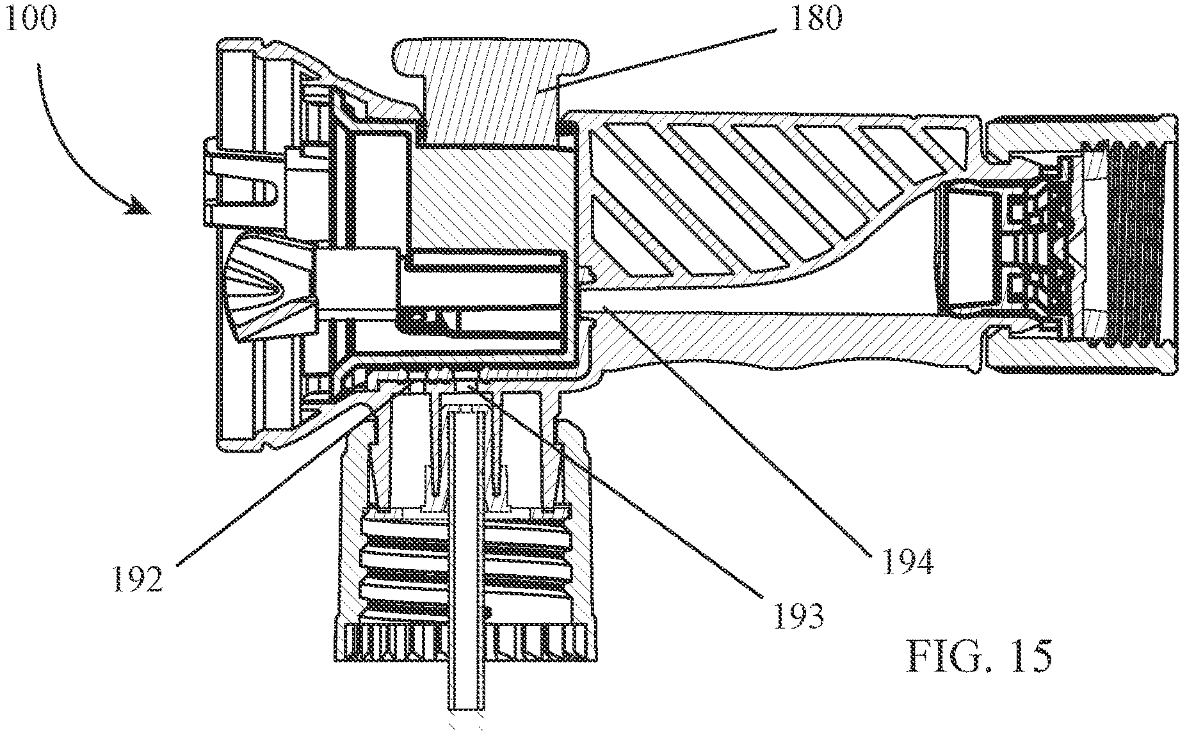
FIG. 15 illustrates a cross-sectional view of a hose-end-sprayer in a first “off” position according to various embodiments of the invention.
Figure 16:
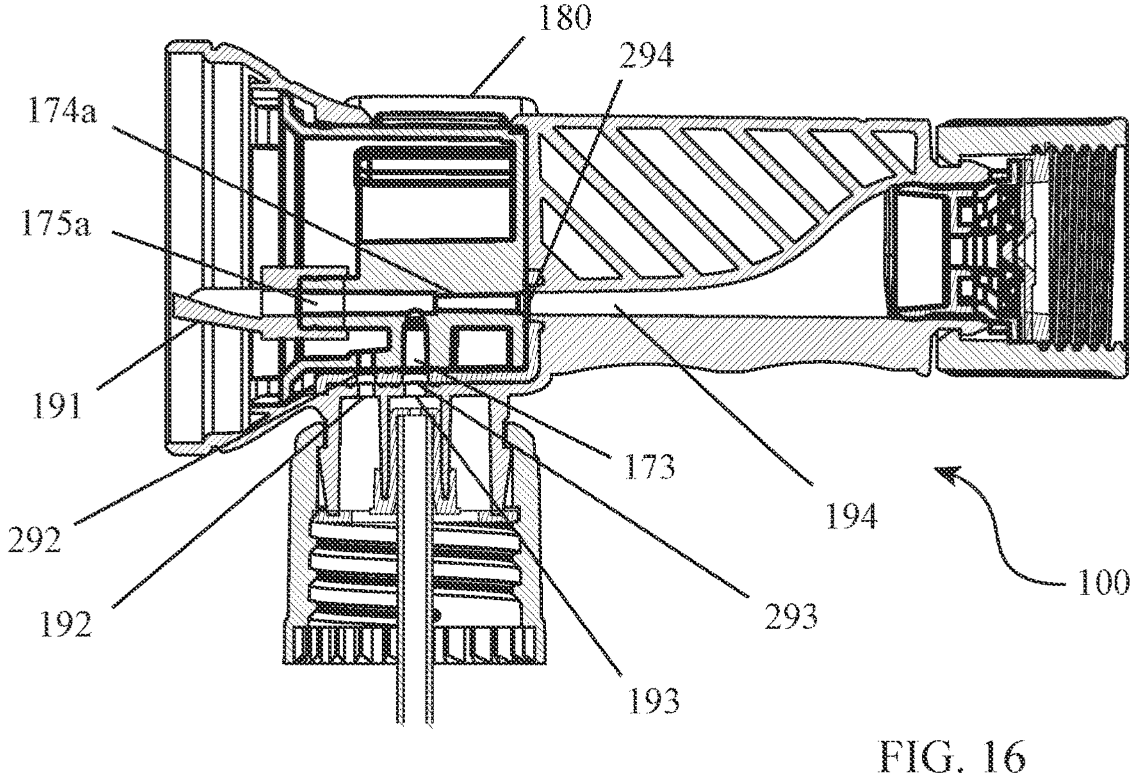
FIG. 16. Illustrates a cross-sectional view of the hose-end-sprayer of FIG. 15 in a second “on” position.
Figure 17:
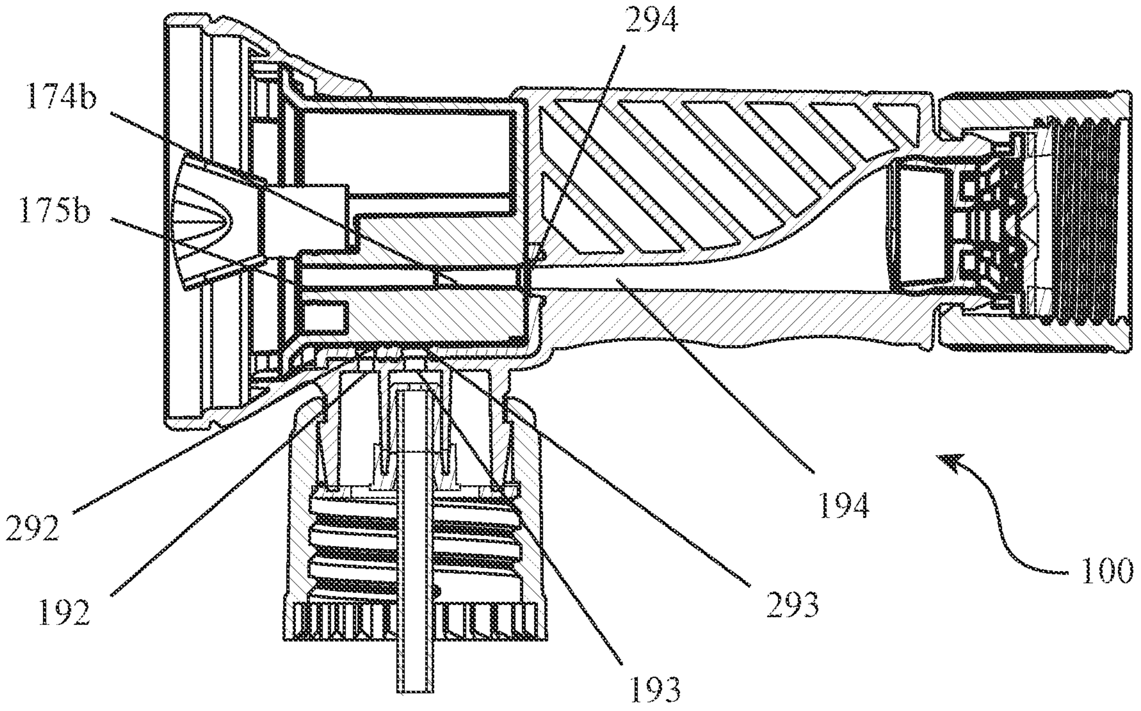
FIG. 17 illustrates a cross-sectional view of the hose-end-sprayer of FIG. 15 in a third “carrier fluid” position.

FIGS. 15 through 17 illustrate cross-sectional views of another hose-end-sprayer 100 according to embodiments of the invention in a first “off” position, a second “on” position, and a third “carrier fluid” position, respectively.

As illustrated in FIG. 15, the hose-end-sprayer 100 is in a first “off” position. The valve 160 is rotated such that the valve 160 openings are blocked and carrier fluid and product are not able to exit the hose-end-sprayer 100. In addition, the vent opening 192 is blocked, preventing any fluid or product stored in a container attached to the hose-end-sprayer 100 from leaking through the vent opening 192. As shown, in the first “off” position, the valve vent opening 172 is not aligned with the seal pad vent opening 292 or the vent opening 192 in the sprayer body 100. Likewise, the valve product fluid opening 173 is not aligned with the seal pad product fluid opening 293 or the product fluid opening 193. The valve carrier fluid opening 174 is also not aligned with the seal pad carrier fluid opening 294 or the carrier fluid opening 194. Thus, carrier fluid cannot pass through the hose-end-sprayer 100 as it is blocked by the valve 160.

FIG. 16 illustrates the hose-end-sprayer 100 illustrated in FIG. 15, wherein the valve 160 has been rotated by movement of the lever 180 such that the openings in the valve 160 are aligned with the openings in the sprayer body 100 to allow both a carrier fluid and a product to pass through the hose-end-sprayer 100. As illustrated, carrier fluid opening 194 is aligned with the seal pad carrier fluid opening 294 and the first valve carrier fluid opening 174*a*, allowing a carrier fluid to pass through the hose-end-sprayer 100. The product fluid opening 193 is also aligned with the seal pad product fluid opening 293 and the valve product fluid opening 173, allowing product to flow into the first valve carrier fluid opening 174*a* where it mixes with the carrier fluid and is expelled through the first valve carrier fluid discharge port 175*a*. The mixture of carrier fluid and product exiting the first valve carrier fluid discharge port 175*a* may impact the dispersion device 191, creating a shaped spray pattern for the resulting fluid being dispensed from the hose-end-sprayer 100.

FIG. 17 illustrates the hose-end-sprayer 100 of FIG. 15 in a third “carrier fluid” position in which only a carrier fluid is allowed to pass through the hose-end-sprayer 100 and no product is dispensed.

As shown in FIG. 17, the valve 160 is rotated such that the second valve carrier fluid opening 174*b* is aligned with the seal pad carrier fluid opening 294 and the carrier fluid opening 194 of the sprayer body 110. The valve product fluid opening 173 and valve vent opening 172 are not aligned with the seal pad product fluid opening 293 and seal pad vent opening 292 or the product fluid opening 193 and vent opening 192 of the sprayer body 110. The lack of such alignment precludes the flow of product from a container connected to the hose-end-sprayer 100 into the valve 160 and out of the dispenser. In this manner, a user may selectively spray just the carrier fluid from the hose-end-sprayer 100.

Hose-end-sprayers 100 according to various embodiments of the invention are unique in that various embodiments may share similar parts. For example, according to certain embodiments of the invention, a hose-end-sprayer 100 having two select positions—"off" and "on"—may share a sprayer body 110 and other features with a hose-end-sprayer 100 having three select positions—"off" and "on" and "carrier fluid"—which is not found with existing hose-end-sprayers on the market. According to embodiments of the invention, the number of selections for a hose-end-sprayer 100 may be dependent on the valve 160 selected and assembled with the sprayer body 110. This presents an economic advantage for hose-end-sprayers 100 made according to embodiments of the present invention because similar parts may be used with different types of hose-end-sprayers 100, allowing mass production of some parts for multiple sprayers.

According to various embodiments of the invention, a hose-end-sprayer 100 may be created or assembled in utilizing common components and custom components to arrive at a dispenser having desired characteristics. For example, in certain embodiments of the invention, a hose-end-sprayer 100 is assembled using the following process in which the various steps may be carried out in different orders as desired. A universal sprayer body 110 may be provided. A valve 160—having desired dispensing features, ratios, and other features—may be selected along with a corresponding seal pad 190. The seal pad 190 may be assembled or seated within the sprayer body 110. A lever 180 may be selected and held in the lever opening 118 as the selected valve 160 is assembled, or inserted, into the sprayer body 110. As the valve 160 is assembled with the sprayer body 110, the lever flange 182 slides into the lever guide 164 and locks the lever 180 to the valve 160. The valve flange 165 may snap over valve detents 198 in the sprayer body 110, securing the valve 160 in the sprayer body 110. Movement of the lever 180 may rotate the valve 160 into the various positions of the hose-end-sprayer 100. A container nut 130, retainer 132, container gasket 134 and dip tube 134 may be selected as necessary or in accordance with the desired output and assembled to the sprayer body 110 in a known fashion. Similarly, a hose nut 140, hose gasket 142, and an anti-siphon component 144—if necessary—may be selected and attached to or assembled on the sprayer body 110. A shipping clip 150 may be seated on the sprayer body 110 in contact with the valve 160 to prevent movement of the valve 160.

According to various embodiments of the invention, a valve 160 may be selected from a valve 160 having two dispensing selections, three dispensing selections, or some other combination. The valve 160 selected may also have openings of different sizes depending on the amount of fluid, or rate of fluid flow, desired through the valve 160. For instance, if more product is desired to flow through the valve 160, a valve 160 having a larger valve product fluid opening 173 can be selected and a corresponding seal pad 190 capable of allowing the passage of the desired amount of product can be selected and used to assemble the hose-end-sprayer 100.

The ability to use common components, such as a common sprayer body 110, container nut 130 and connection system, hose nut 140 and connection system, or other components, with a custom valve 160 reduces the costs associated with the manufacturing and production of such hose-end-sprayers 100 because a common sprayer body 110 may be molded in large quantities and used with multiple different types of hose-end-sprayers 100.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A hose-end-sprayer, comprising:

a sprayer body, comprising:

- a product opening;
- a carrier fluid opening;
- a dispensing opening; and
- a sprayer body axis extending from the carrier fluid opening to the dispensing opening;

a seal pad, comprising:

- a seal pad product opening aligned with the product opening of the sprayer body: and
- a seal pad carrier fluid opening aligned with the carrier fluid opening of the sprayer body;

a valve seated in the sprayer body, comprising:

- a central axis parallel to the sprayer body axis;
- a valve product opening; and
- a valve carrier fluid opening;
- a lever attached to the valve and configured to rotate the valve about the central axis between a first "off position and a second "on" position.

2. The hose-end-sprayer of claim 1, wherein the product opening is aligned with the valve product opening and the carrier fluid opening is aligned with the valve carrier fluid opening in the "on" position.

3. The hose-end-sprayer of claim 1, wherein the product opening is not aligned with the valve product opening in the "off position.

4. The hose-end-sprayer of claim 1, wherein the valve further comprises a second valve carrier fluid opening and wherein the second valve carrier fluid opening is aligned with the carrier fluid opening allowing only carrier fluid to pass through the valve.

5. The hose-end-sprayer of claim 1, wherein the sprayer body further comprises: a lever opening; a container connection opening; and a hose connection opening.

6. The hose-end-sprayer of claim 5, further comprising: a ramp on the container connection opening; and a container nut attached to the ramp.

7. The hose-end-sprayer of claim 5, further comprising: a ramp on the hose connection opening; and a hose nut attached to the ramp.

8. The hose-end-sprayer of claim 1, wherein the sprayer body further comprises at least one valve detent and the valve further comprises a valve flange, wherein the at least one valve detent engages the valve flange to retain the valve in the sprayer body.

9. The hose-end-sprayer of claim 1, wherein the valve further comprises a lever guide and the lever further comprises a lever flange, wherein the lever flange fits in the lever guide.

10. The hose-end-sprayer of claim 1, wherein the sprayer body axis and the central axis of the valve are aligned.

11. A method for producing a hose-end-sprayer, comprising:

providing a sprayer body, a seal pad, a lever, a container connection system, a hose connection system, and a cylindrical valve comprising a central axis;

assembling the seal pad with the sprayer body;

assembling the lever and valve in the sprayer body such that movement of the lever rotates the cylindrical valve about the central axis within the sprayer body, said assembling the lever and valve comprising:

the lever further comprises a lever flange; and the valve further comprises a lever guide, suspending the lever in a lever opening of the sprayer body; inserting the valve into an interior of the sprayer body; aligning the lever guide with the lever flange; and snapping the lever flange in the lever guide;

assembling the container connection system to the sprayer body; and assembling the hose connection system to the sprayer body.

12. The method of claim 11, further comprising snapping the valve over at least one valve detent in the sprayer body.

* * * * *